(12) United States Patent
Curello et al.

(10) Patent No.: US 7,617,842 B2
(45) Date of Patent: Nov. 17, 2009

(54) VALVES FOR FUEL CARTRIDGES

(75) Inventors: Andrew Curello, Hamden, CT (US);
Paul Spahr, New Haven, CT (US)

(73) Assignee: Société BIC (FR)

( * ) Notice: Subject to any disclaimer, the term of this patent is extended or adjusted under 35 U.S.C. 154(b) by 202 days.

(21) Appl. No.: 11/391,578

(22) Filed: Mar. 28, 2006

(65) Prior Publication Data

US 2006/0196562 A1    Sep. 7, 2006

Related U.S. Application Data

(63) Continuation-in-part of application No. 10/978,949, filed on Nov. 1, 2004, which is a continuation-in-part of application No. 10/629,006, filed on Jul. 29, 2003.

(51) Int. Cl.
*F16L 37/28* (2006.01)
(52) U.S. Cl. ............... 137/614.2; 137/630.14; 137/614.03; 137/614.05
(58) Field of Classification Search ............ 137/614.03, 137/614.04, 614.05, 614.2, 628, 630, 630.14
See application file for complete search history.

(56) References Cited

U.S. PATENT DOCUMENTS

| | | | |
|---|---|---|---|
| 4,200,121 A * | 4/1980 | Walter et al. ........... | 137/614.05 |
| 4,261,956 A | 4/1981 | Adlhart | |
| 5,494,073 A * | 2/1996 | Saito ..................... | 137/614.03 |
| 5,709,243 A * | 1/1998 | Wells et al. ............ | 137/614.03 |
| 5,723,229 A | 3/1998 | Scheifers | |
| 5,791,366 A * | 8/1998 | Lo ........................ | 137/614.04 |
| 5,945,231 A | 8/1999 | Narayanan | |
| 5,992,008 A | 11/1999 | Kindler | |
| 6,135,150 A * | 10/2000 | Powell et al. .......... | 137/614.04 |
| 6,161,578 A | 12/2000 | Braun | |
| 6,506,513 B1 | 1/2003 | Yonetsu | |
| 6,523,863 B2 * | 2/2003 | Ishiwata ................ | 137/614.03 |
| 6,708,740 B2 | 3/2004 | Wessberg | |
| 6,916,007 B2 | 7/2005 | deCler | |
| 2002/0197522 A1 | 12/2002 | Lawrence | |
| 2003/0077493 A1 | 4/2003 | Colborn | |
| 2003/0082427 A1 | 5/2003 | Prasad | |
| 2003/0096150 A1 | 5/2003 | Rice | |
| 2005/0116190 A1 | 6/2005 | Adams | |

* cited by examiner

*Primary Examiner*—Kevin L Lee
(74) *Attorney, Agent, or Firm*—The H.T. Than Law Group

(57) ABSTRACT

Valves for connecting fuel supplies to a device are disclosed. The fuel supplies can be a pressurized or non-pressurized cartridge that can be used with any device, such as fuel cells or fuel refilling apparatus. The valve includes face seals to minimize the amount of fuel remaining in the valve when the fuel supply is separated from the device. In one embodiment, the valve includes deformable members including sealing surfaces, where the flow paths through the valve are sealed and unsealed by the deformation of the deformable members. In another embodiment, the female valve component includes a shortened body to limit the volume of fuel remaining in the valve. The female valve component also includes a cap with slots formed therein so that residual fuel can drain from the valve component into a fuel reservoir.

28 Claims, 7 Drawing Sheets

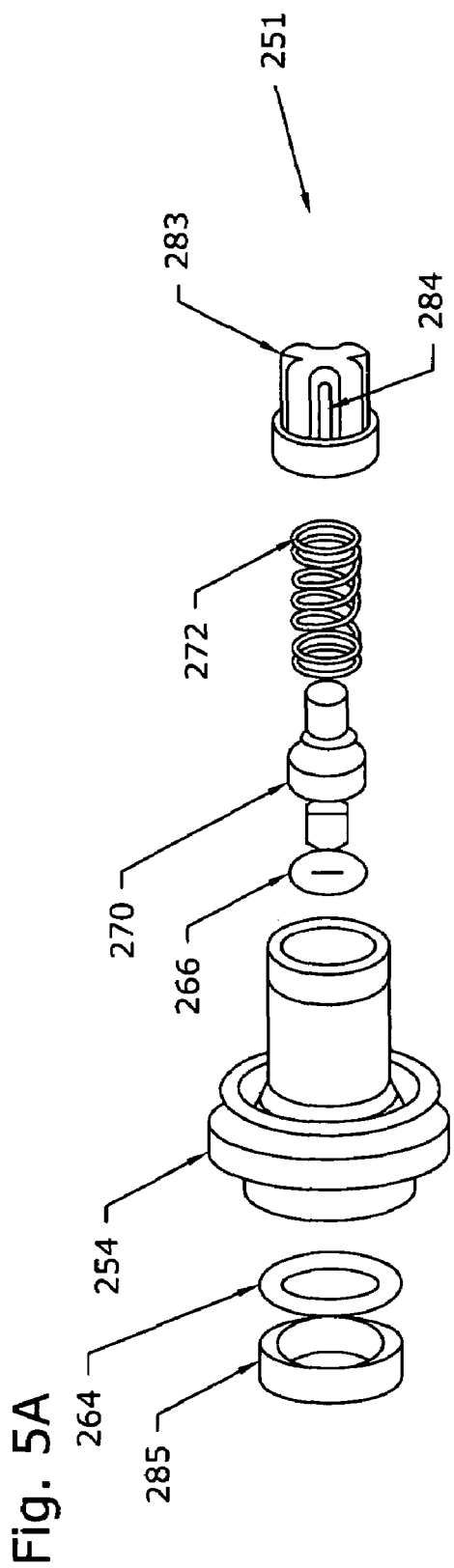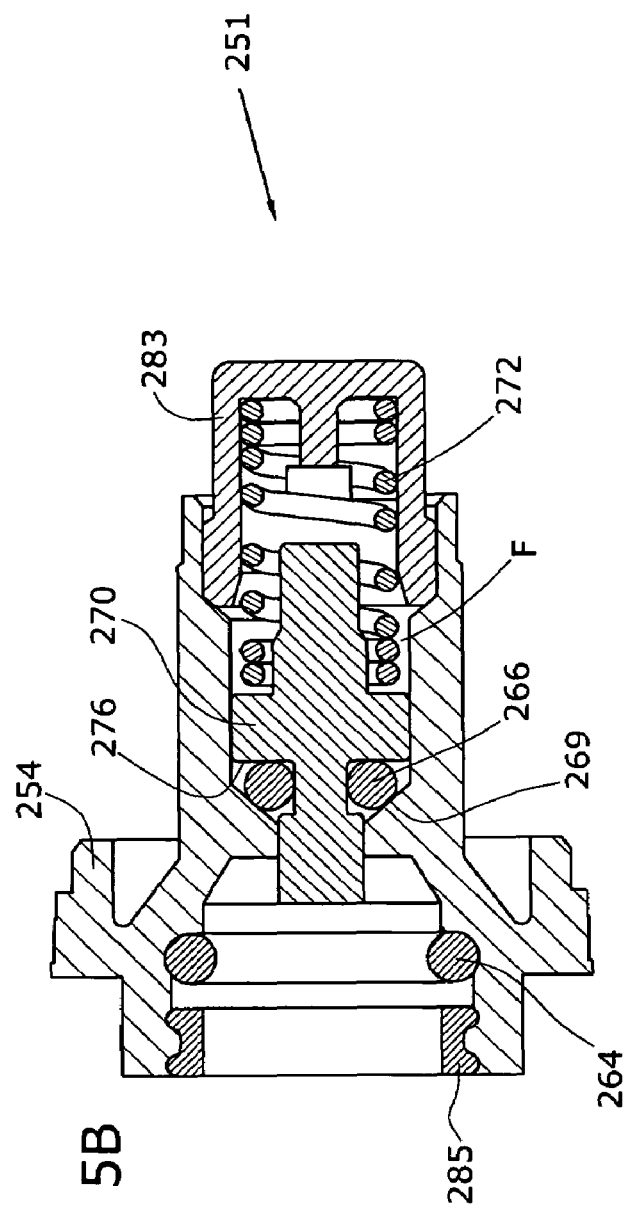
Fig. 5A
Fig. 5B

VALVES FOR FUEL CARTRIDGES

CROSS-REFERENCE TO RELATED APPLICATIONS

This application is a continuation-in-part of co-pending patent application entitled "Valves for Fuel Cartridges," bearing application Ser. No. 10/978,949, filed on Nov. 1, 2004, which is a continuation-in-part of co-pending patent application entitled "Fuel Cartridge with Connecting Valve," bearing application Ser. No. 10/629,006, filed on Jul. 29, 2003. The disclosure of this parent application is incorporated herein by reference in its entirety.

FIELD OF THE INVENTION

This invention generally relates to valves for cartridges supplying fuel to various fuel cells, valves for the fuel cells and valves for fuel refilling devices.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into three general categories, namely (i) fuel cells utilizing compressed hydrogen ($H_2$) as fuel, (ii) proton exchange membrane (PEM) fuel cells that use methanol ($CH_3OH$), sodium borohydride ($NaBH_4$), hydrocarbons (such as butane) or other fuels reformed into hydrogen fuel, and (iii) PEM fuel cells that can consume non-hydrogen fuel directly or direct oxidation fuel cells. The most common direct oxidation fuel cells are direct methanol fuel cells or DMFC. Other direct oxidation fuel cells include direct ethanol fuel cells and direct tetramethyl orthocarbonate fuel cells.

Compressed hydrogen is generally kept under high pressure and is therefore difficult to handle. Furthermore, large storage tanks are typically required and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. DMFC, where methanol is reacted directly with oxidant in the fuel cell, is the simplest and potentially smallest fuel cell, and also has promising power application for consumer electronic devices.

DMFC for relatively larger applications typically comprises a fan or compressor to supply an oxidant, typically air or oxygen, to the cathode electrode, a pump to supply a water/methanol mixture to the anode electrode, and a membrane electrode assembly (MEA). The MEA typically includes a cathode, a PEM and an anode. During operation, the water/methanol liquid fuel mixture is supplied directly to the anode, and the oxidant is supplied to the cathode. The chemical-electrical reaction at each electrode and the overall reaction for a direct methanol fuel cell are described as follows:

Half-reaction at the anode:

$$CH_3OH+H_2O \rightarrow CO_2+6H^++6e^-$$

Half-reaction at the cathode:

$$O_2+4H^++4e^- \rightarrow 2H_2O$$

The overall fuel cell reaction:

$$CH_3OH+1.5O_2 \rightarrow CO_2+2H_2O$$

Due to the migration of the hydrogen ions ($H^+$) through the PEM from the anode through the cathode and due to the inability of the free electrons ($e^-$) to pass through the PEM, the electrons must flow through an external circuit, which produces an electrical current through the external circuit. The external circuit may be any useful consumer electronic devices, such as mobile or cell phones, calculators, personal digital assistants, laptop computers and power tools, among others. DMFC is discussed in U.S. Pat. Nos. 5,992,008 and 5,945,231, which are incorporated by reference in their entireties. Generally, the PEM is made from a polymer, such as Nafion® available from DuPont, which is a perfluorinated sulfuric acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

As discussed above, for other fuel cells, fuel is reformed into hydrogen and the hydrogen reacts with oxidants in the fuel cell to produce electricity. Such reformat fuel includes many types of fuel, including methanol and sodium borohydride. The cell reaction for a sodium borohydride reformer fuel cell is as follows:

$$NaBH_4+2H_2O \rightarrow \text{(heat or catalyst)} \rightarrow 4(H_2)+(NaBO_2)$$

$$H_2 \rightarrow 2H^++2e^- \text{ (at the anode)}$$

$$2(2H^++2e^-)+O_2 \rightarrow 2H_2O \text{ (at the cathode)}$$

Suitable catalysts include platinum and ruthenium, among other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference.

Valves are needed for transporting fluids and gasses between devices, such as fuel cartridges, fuel cells and/or fuel refilling devices. The known art discloses various valves and flow control devices such as those described in U.S. Pat. Nos. 6,506,513 and 5,723,229 and in U.S. published application nos. 2003/0082427 and 2002/0197522. A need, however, exists, inter alia, for improved valves for maintaining seals, improving the flow of fuel through the valve, and limiting residual fluid or gas in the valve upon shut off.

SUMMARY OF THE INVENTION

According to the invention, a valve includes a first valve component connectable to either a fuel supply or a device and a second valve component connectable to the other of either a fuel supply or a device, wherein the valve components are configured to be mated with each other. An inter-component sealing member is disposed between the faces of the first valve component face and the second valve component. Furthermore, each valve component comprises a housing, a movable inner body, and a flow path. The movable inner body cooperates with a sealing surface to form a seal within each valve component, such that, during connection, the first valve component and the second valve component form an inter-component seal at an interface of the first valve component and the second valve component prior to the movable inner body sealing the flow path.

According to another aspect of the invention, a valve includes a first valve component connectable to either a fuel supply or a device and a second valve component connectable to the other of either a fuel supply or a device. The face of the first valve component face is configured to mate with the face of the second valve component face. An inter-component sealing member is disposed between the valve component faces. Each valve component includes a stationary body, a biased slidable body, and a flow path. The biased slidable body cooperates with a sealing surface to form an internal seal within each valve component. During connection the stationary body of one valve component moves the biased slidable body of the other valve component and the first valve component and the second valve component form an inter-component seal at the interface therebetween. The first and second valve components close sequentially such that a suck-back effect is created in the later-closing valve.

BRIEF DESCRIPTION OF THE DRAWINGS

In the accompanying drawings, which form a part of the specification and are to be read in conjunction therewith and in which like reference numerals are used to indicate like parts in the various views:

FIG. 1A is a cross-sectional view of a valve connectable to a liner in the cartridge of FIG. 1;

FIG. 5A is an exploded perspective view of another exemplary valve component according to the present invention, and FIG. 5B is a cross-sectional view of the assembled valve component of FIG. 5A.

DETAILED DESCRIPTION OF THE PREFERRED EMBODIMENTS

Figure 1:
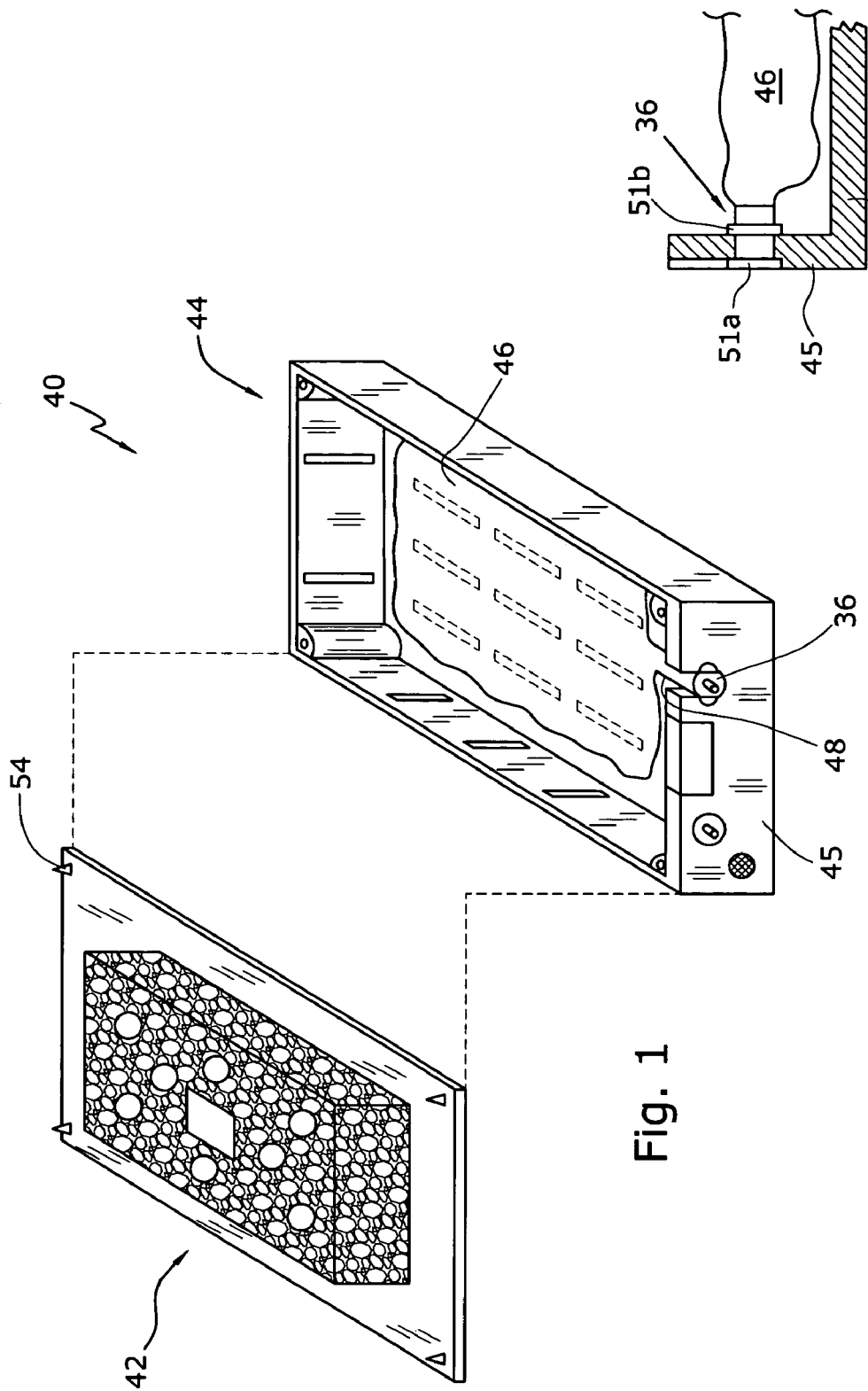
FIG. 1 is an exploded, perspective view of an exemplary fuel cartridge of an embodiment of the present invention.
Figure 2:
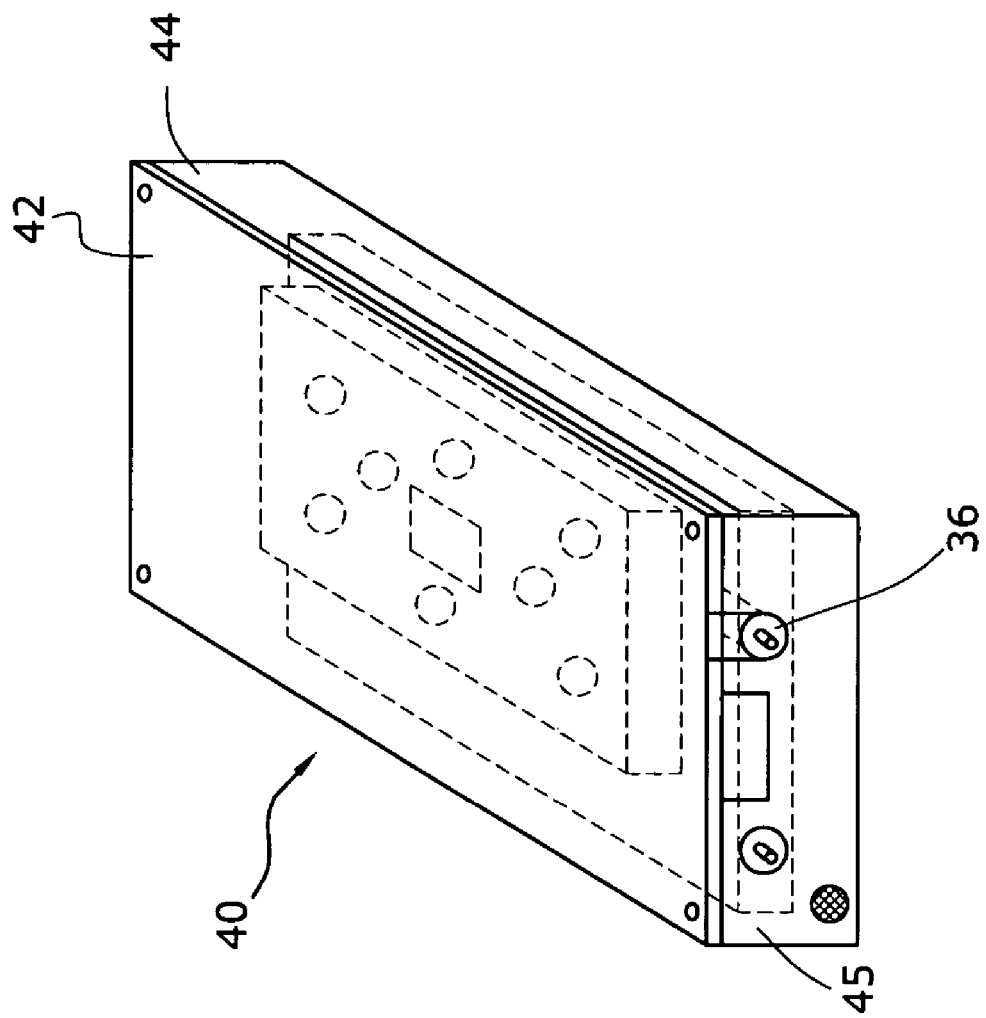
FIG. 2 is a perspective view of the cartridge of FIG. 1.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cells and reformat fuel cells, among others. The fuel supply may contain other types of fuel cell fuels, such as ethanol or alcohols, metal hydrides, such as sodium borohydrides, other chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid-borne zinc particles immersed in a KOH electrolytic reaction solution, and the anodes within the cell cavities are particulate anodes formed of the zinc particles. KOH electrolytic solution is disclosed in United States published patent application no. 2003/0077493, entitled "Method of Using Fuel Cell System Configured to Provide Power to One or More Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include a metal hydride such as sodium borohydride ($NaBH_4$) and water, discussed above and the low pressure, low temperature produced by such reaction. Fuels further include hydrocarbon fuels, which include, but are not limited to, butane, kerosene, alcohol and natural gas, disclosed in United States published patent application no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. Fuel includes hydrogen gas. The term "fuel" as used herein includes all fuels that can be reacted in fuel cells or in the fuel supply, and includes, but is not limited to, all of the above suitable fuels, electrolytic solutions, oxidant solutions, gases, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supply.

The fuel supply of the present invention can also be used to store fuels that are not used in fuel cells. These applications include, but are not limited to, storing hydrocarbons and hydrogen fuels for micro gas-turbine engines built on silicon chips, discussed in "Here Come the Microengines," published in The Industrial Physicist" (December 2001/January 2002), at pp. 20-25. For the purpose of the present application, "fuel cells" also include these micro-engines. Other applications include storing traditional fuels for internal combustion engines, and hydrocarbons, such as butane for pocket and utility lighters and liquid propane, as well as chemical fuels for use in personal portable heating devices. As used herein, the term "fuel cell" includes fuel cells as well as other machineries usable with the cartridges of the present invention.

Suitable fuel supplies include those disclosed in commonly owned, co-pending U.S. patent application Ser. No. 10/356,793, entitled "Fuel Cartridge for Fuel Cells," filed on Jan. 31, 2003. The disclosure of this application is hereby incorporated in its entirety. An embodiment of a suitable fuel cell cartridge is shown in FIG. 1. Cartridge 40 may contain any type of fuel cell fuel, as discussed above. Cartridge 40 comprises housing top 42 and housing body 44. Body 44 is preferably configured and dimensioned to receive optional fuel bladder or fuel liner 46, as shown in FIG. 1. Fuel liners are fully disclosed in commonly owned, co-pending U.S. patent application Ser. No. 10/629,004, entitled "Fuel Cartridge with Flexible Liner," filed on Jul. 29, 2003. The disclosure of this application is hereby incorporated by reference in its entirety. As shown, cartridge 40 is illustrated as having a rectangular prism shape. Alternatively, cartridge 40 can have any shape or form, e.g., cylindrical or spherical, and the outer casing can be constructed out of a plastic or a metal.

In one embodiment, a portion of a connecting valve 36 is mounted on upstanding endwall 45 of body 44, with a corresponding portion of connecting valve 36 attached to the fuel cell or filling device. Endwall 45 defines slot 48, which is adapted to receive valve 36. Valve 36 can be used to fill cartridge 40 with fuel, and valve 36 can also be used to selectively transport fuel from cartridge 40 to the fuel cell. As shown in FIG. 1A, valve 36 preferably comprises two external flanges 51*a,b* that straddle endwall 45 to secure valve 36 in place. Preferably, outer flange 51*a* is flush with the outer surface of endwall 45, as shown. Slot 48 is preferably sealed with a sealing member (not shown) such as a plug, O-ring, a gasket or the like inserted into slot 48. The sealing member can be made from elastomeric, rubber or filler materials among other suitable sealing materials. Valve 36 or a portion thereof may also be sealed into slot 48 by any method known in the art, such as by ultrasonic welding, adhesive, etc.

Valve 36 is preferably an automatic shut-off valve, such as a check valve, so that fuel cannot flow through valve 36 when cartridge 40 is not properly connected to a device, such as a filling reservoir or a fuel cell.

Valve 36 may include many different internal configurations, depending upon many factors, including the precise application of the fuel supply, e.g., residential versus industrial use, and the type of fuel stored in cartridge 40. Suitable shut-off valves include those disclosed in the parent '949 and '006 applications, both of which were previously incorporated by reference. Additional suitable valves are discussed in co-owned PCT application no. PCT/US 2005/04826, entitled "Fuel Supply Systems Having Operational Resistance," filed on Feb. 16, 2005, the disclosure of which is hereby incorporated by reference in its entirety.

Figure 3A:
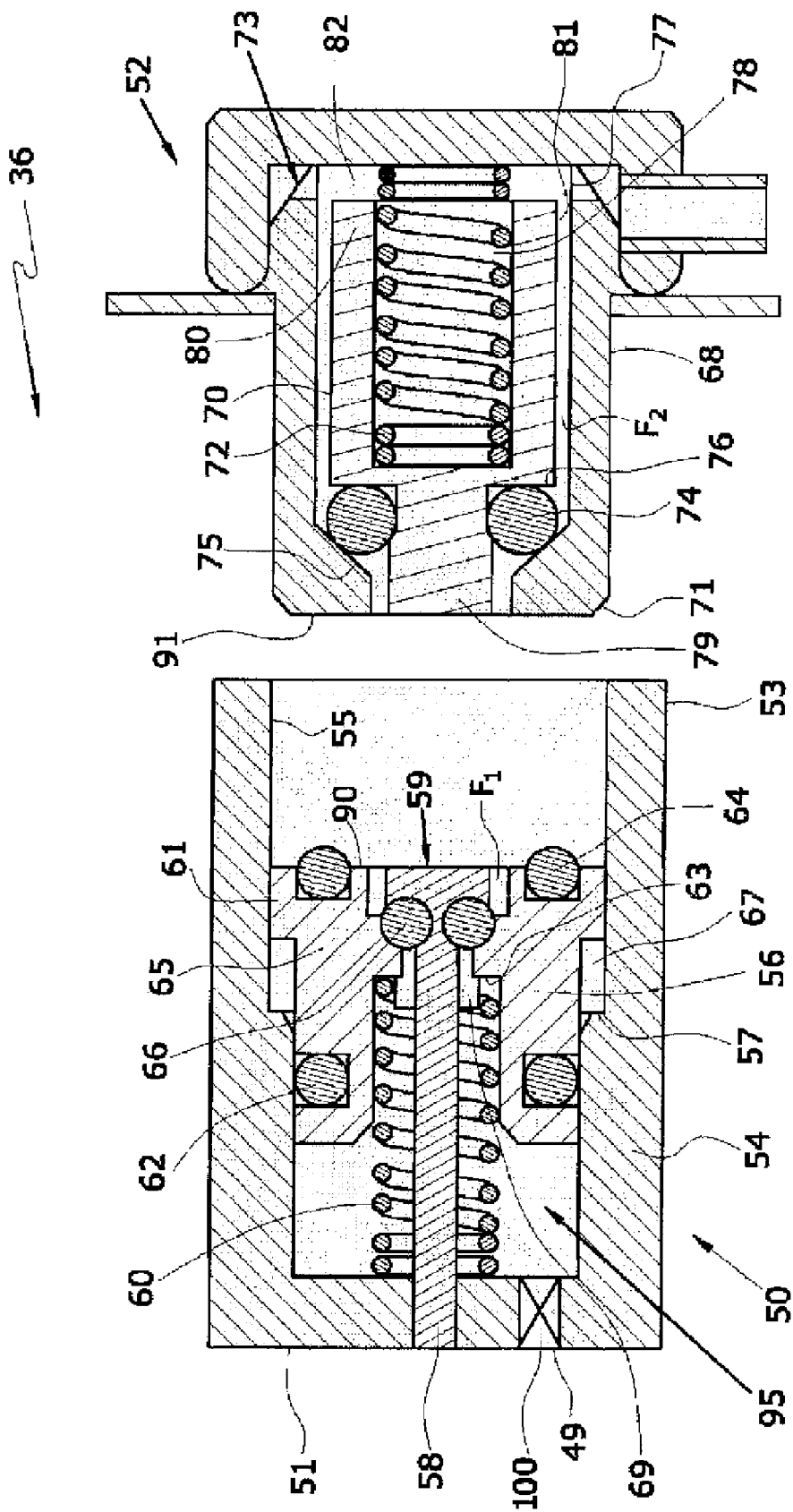
FIGS. 3A-3C are enlarged, cross-sectional views of an exemplary valve according to the present invention showing the opening sequence from closed in FIG. 3A to engaged and closed in FIG. 3B to open in FIG. 3C.
Figure 3B:
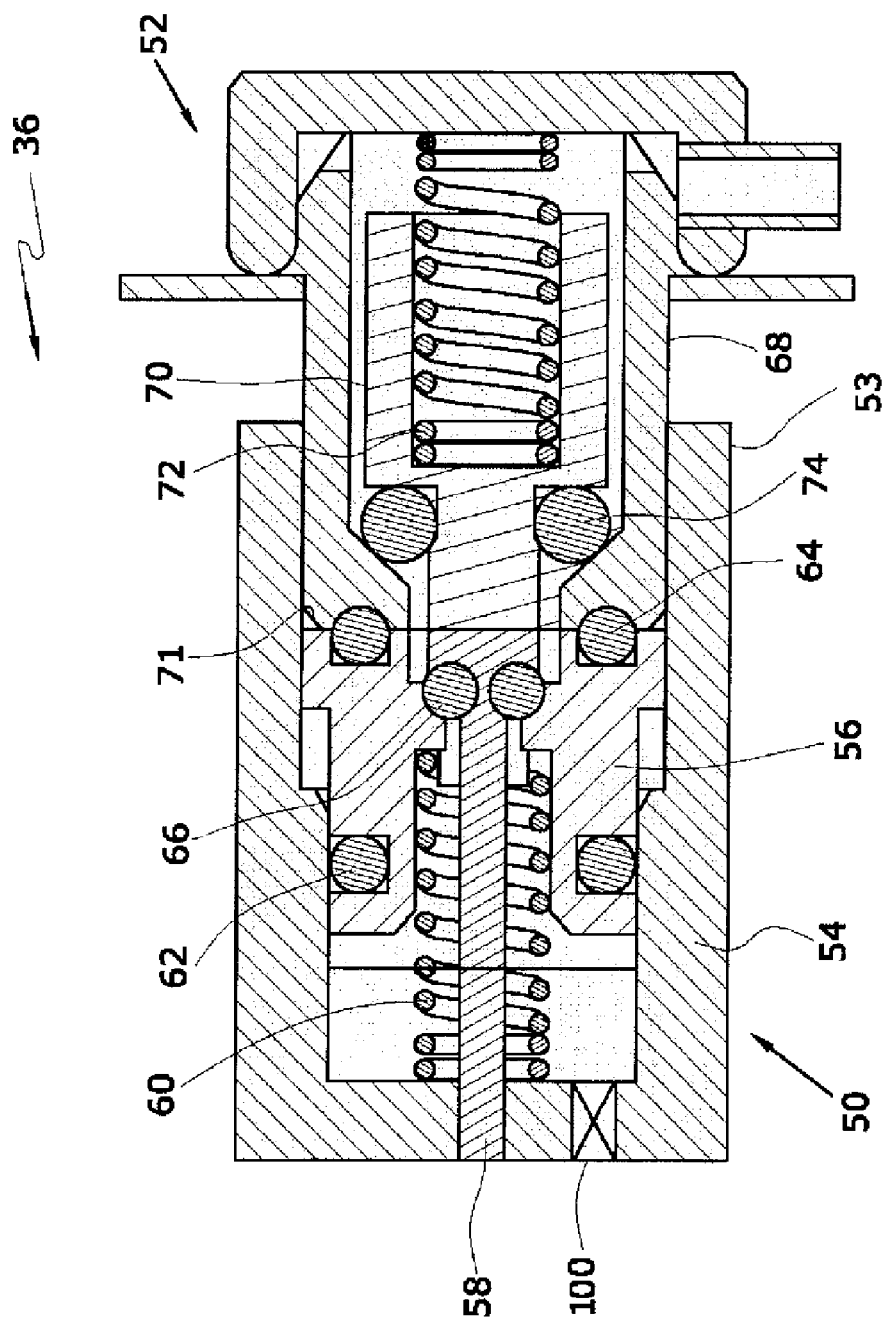
Figure 3C:
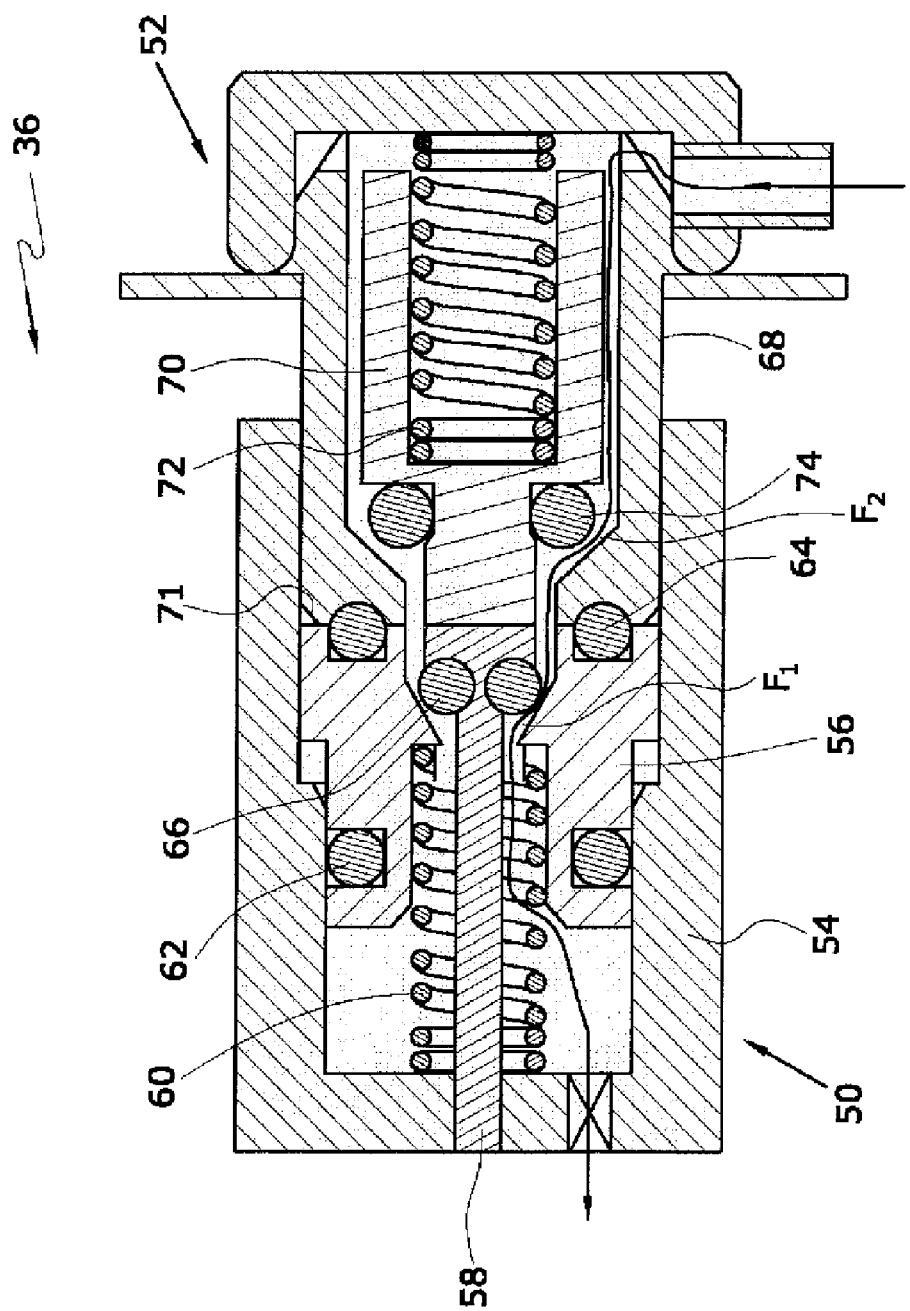

Another embodiment of a suitable valve 36 is a face seal valve, such as is shown in FIGS. 3A-3C, where valve 36 comprises a first valve component 50 and a corresponding second valve component 52. Second valve component 52 is configured to be fluidly connected to first valve component 50. For example, first valve component 50 may be configured such that a portion of second valve component 52 is inserted into first valve component 50. In other embodiments, first and second valve components 50, 52 are aligned with each other using any method known in the art, for example, by attaching or inserting valve components 50, 52 to additional holders such as a sleeve or components on fuel supply 40 and/or the fuel cell or device. In one embodiment, first valve component 50 is located on cartridge 40 and second valve component 52 is positioned on the device; in another embodiment, the configuration is reversed, with first valve component 50 located on the device and second valve component 52 positioned on cartridge 40.

Referring to FIG. 3A, first valve component 50 includes a first housing 54 having a back end 51 and a front end 53. First housing 54 is generally cylindrical and made from a material that is effectively inert to the fluid or gas, i.e., is capable of withstanding lengthy exposure to the fluid or gas without substantial degradation, leaching, and/or contamination of the fuel. For example, first housing 54 may be made from stainless steel. Additional suitable materials are discussed in commonly-owned US patent publication 2005/0116190, published on Jun. 2, 2005, entitled "Fuel Cell Supply Having Fuel Compatible Materials," which is incorporated herein in its entirety by reference thereto.

First housing 54 preferably includes at least two inner diameters such that an inner wall 55 of first housing 54 forms a shoulder 57. Additionally, front end 53 of first valve component 50 is sized to receive a front end 71 of a second housing 68 of second valve component 52. Back end 51 of first housing 54 includes a relatively small opening 49 to allow the fluid or gas to pass into and/or out of valve 36.

A valve post 58 is fixedly attached to back end 51 of first housing 54. Valve post 58 is preferably a thin cylindrical body with an endcap 59 at its front end. Preferably, valve post 58 is made of a material similar to or the same as that of first housing 54 so that valve post 58 may be readily affixed thereto using any method known in the art, such as welding, press fit or adhering with a fixative agent.

A valve sleeve 56 is slidably disposed within first housing 54 and around valve post 58. Valve sleeve 56 is also, preferably, made of a material that is effectively inert to the fuel. Valve sleeve 56 is sized and dimensioned to fit within first housing 54 so that valve sleeve 56 slides along inner wall 55. Preferably, valve sleeve 56 is slip fit within first housing 54. In this embodiment, a sleeve-sealing member 62 is disposed between valve sleeve 56 and inner wall 55 of first housing 54 so that no flow can occur between valve sleeve 56 and first housing 54. Preferably, sleeve-sealing member 62 is an O-ring, although it may be any sealing element known in the art, such as a gasket or a highly viscous fluid. Valve sleeve 56 includes a cap 61 proportioned such that cap 61 cannot pass outer shoulder 57 when moving toward back end 51, i.e., outer shoulder 57 acts as a stop for valve sleeve 56 within first housing 54. An inner wall 63 of valve sleeve 56 is sized to define a flow path $F_1$ between inner wall 63 and valve post 58. Additionally, valve sleeve 56 also has inner shoulder 65 that extends inwardly so that valve sleeve 56 cannot move past endcap 59 of valve post 58 when moving away from back end 51. Valve sleeve 56 is slidable between shoulder 57 and endcap 59.

First valve component 50 includes several sealing elements to limit the flow therethrough to path $F_1$ when valve component 50 is open. While any number of sealing elements such as O-rings, gaskets, overmolded elastomeric portions, or viscous materials may be used, preferably first valve component 50 includes three such sealing elements, preferably O-rings. A post-sealing member 66 is disposed between valve post 58 and valve sleeve 56, preferably at or near shoulder 65. In other words, post-sealing member 66 is positioned within flow path $F_1$ to close flow path $F_1$ when first valve component 50 is closed. A face-sealing member 64 is disposed on a first face 90 of front end 53 of first valve component 50. Face seal 64 can also be located in second valve component 52. Face-sealing member 64 is sized and dimensioned to provide an inter-component seal when second valve component 52 is engaged with first valve component 50, i.e., when first face 90 comes into contact with a second face 91 on a front end 71 of second valve member 52, face-sealing member 64 is in contact with both first face 90 and second face 91 to seal the interface of first and second valve components 50, 52.

A spring 60 is disposed around valve post 58 and contacts a portion of valve sleeve 56 to bias valve sleeve to the closed position. In the embodiment shown in FIG. 3A, spring 60 is disposed within a portion of valve sleeve 56. In another embodiment, spring 60 may extend only to an end of valve sleeve 56, such that spring 60 is in contact with valve sleeve 56 but is not disposed within valve sleeve 56. Spring 60 may be any type of spring known in the art capable of biasing valve sleeve 56 toward front end 53, such as a stainless steel helical spring. Spring 60 preferably engages with an inner shoulder 69 of valve sleeve 56. The spring constant of spring 60 is selected to allow valve sleeve 56 to slide toward back end 51 only when a force greater than a predetermined threshold is applied by the insertion of second valve component 52.

Second valve component 52 is generally a check valve and includes a second housing 68 having a front end 71 and a back end 73. Check valves are fully disclosed in the parent '949 and '006 applications, and as used in the present application a check valve has a slidable body biased into a sealing position with the valve body. Like first housing 54 discussed above, second housing 68 is generally cylindrical and made from a material that is effectively inert to the fuel, such as stainless steel. Second housing 68 preferably includes at least two inner diameters such that an inner wall 77 of second housing 68 forms a housing shoulder 75. Front end 71 of second housing 68 is sized and dimensioned to be received within front end 53 of first housing 54 so that first valve component 50 may engage with second valve component 52.

A valve plunger 70 is slidably disposed within second housing 68. Valve plunger 70, which is preferably made of an inert material, includes a plunger head 79 and a cylindrical rear portion 80 that defines a plunger spring compartment 78. Rear portion 80 does not extend the length of second housing 68, such that a plunger gap 82 is formed between rear portion 80 and back end 73 to allow valve plunger to move within second housing 68. Gap 82 also controls the maximum displacement of valve plunger 70. A plunger spring 72 contained within plunger spring compartment 78 extends to back end 73 of second housing 68. Similar to sleeve spring 60, plunger spring 72 biases valve plunger 70 towards front end 71 to close second valve component 52.

When not engaged with first valve component 50, plunger head 79 is preferably flush with second face 91, as shown in FIG. 3A. Alternatively, plunger head 79 may terminate slightly short of second face 91, or have any other configuration that either allows a minimum amount of force to open valve 36 or provides a minimum distance for valve plunger 70 to move in order to open valve 36.

A second flow path $F_2$ is defined between outer wall 81 and inner wall 77 of second housing 68. Positioned within flow path $F_2$ at or near shoulder 76 is a plunger sealing member 74 to seal second valve component 52 in the closed position. Similar to sealing elements 62, 64, 66, sealing member 74 is preferably an O-ring, but may also be a gasket, overmolded elastomer, or the like. Valve plunger 70 also includes a plunger shoulder 76, which is sized and proportioned to cooperate with housing shoulder 75 to engage sealing member 74 to seal flow path $F_2$. In valve components 50 and 52, valve sleeve 56 and plunger 70 are the two elements that are biased and movable to open the seals in the valve component.

Referring to FIGS. 3A-3C, the opening sequence of valve 36 is as follows. FIG. 3A shows valve 36 separated, i.e., first and second valve components 50, 52 are disengaged from each other, for example, when cartridge 40 is disconnected from the device. In this configuration, sealing members 62, 66, 74 close flow paths $F_1$ and $F_2$. Valve sleeve 56 and valve plunger 70 are biased into the closed positions.

In FIG. 3B, front end 71 of second valve component 52 is inserted into front end 53 of first valve component 50, for example, when cartridge 40 is initially connected to the device but is not yet fully introduced. At this point, face seal 64 is engaged with front end 71 of second valve component 52 and more particularly with the front end of second housing 68 to seal the interface of first and second valve components 50, 52. All other sealing members 62, 66, 72 continue closing off potential flow paths for the fluid or gas. Valve sleeve 56 remains biased to a closed position. Similarly, valve plunger 70 remains biased to a closed position.

In FIG. 3C, first and second valve components 50, 52 are fully engaged, such as when cartridge 40 is completely introduced to the device. Stationary second housing 68 presses against biased valve sleeve 56 so that valve sleeve 56 is moved backward through gap 67, compressing spring 60 and opening first flow path $F_1$. Similarly, stationary valve post 58 pushes biased valve plunger 70 so that valve plunger 70 is translated distally through gap 82, compressing plunger spring 72 and opening second flow path $F_2$. Post-sealing member 66 and plunger sealing member 74 are released to allow fluid or gas to flow through first and second flow paths, $F_1$, $F_2$, respectively. Sleeve-sealing member 62 and face-sealing member 64 remain engaged to isolate the flow to paths $F_1$ and $F_2$.

The closing sequence of valve 36 is essentially the reverse process of the above-described opening sequence. When cartridge 40 is first disengaged from the device, spring 60 and plunger spring 72 release their stored energy, thereby returning biased valve sleeve 56 and biased valve plunger 70 to their original sealing positions. Post-sealing member 66 and plunger-sealing member 74 are once again engaged to close off first and second flow paths, $F_1$, $F_2$, respectively. Sleeve-sealing member 62 is always in the sealed position in this embodiment and face-sealing member 64 remain engaged to provide the inter-component seal. First and second valve components 50, 52 are then completely disengaged. As first and second flow paths $F_1$ and $F_2$ are sealed very near the interface of first and second valve components 50, 52 the fluid volume between seals 66 and 72 is minimized.

As described above, first valve component 50 opens simultaneously with second valve component 52. As will be recognized by those in the art, in some situations advantage may be found in opening the flow path to the device prior to opening the flow path to cartridge 40, for example to ensure that the device is prepared to receive fluid or gas prior to accessing the stores of cartridge 40. This sequential opening may be attained by simply adjusting the length of valve post 58 and/or second housing 68 and plunger head 79. For example, if first valve component 50 is on the device, valve post 58 may be shortened or second housing 68 may be lengthened so that plunger head 79 is recessed therewithin. In such a case, second housing 68 moves valve sleeve 56 prior to valve post 58 engaging with valve plunger 70. Alternatively, if second valve component 52 is on the device, second housing 68 may be recessed within second valve component 52 or one of valve post 58 or valve plunger 79 may be lengthened so that valve post 58 translates valve plunger 79 prior to second housing 68 engaging with valve sleeve 56. Alternatively, one of springs 60 or 72 may provide a lower spring force than the other so that less force is required to open either valve post 56 or valve plunger 79, respectively. Any of these structures or combinations thereof may also result in one valve component having a longer stroke to close its flow path than the other valve component so that one valve component has a longer closing sequence than the other valve component.

In the situation where the closing of first valve component 50 and second valve component 52 are sequential, i.e., one valve component closes later or more slowly than the other, the later-closing valve component may tend to draw residual fluid or gas within its flow path away from the interface of the two valve components 50, 52. This tendency, commonly referred to as "suck-back", occurs when the piston-like motion of a part within a fluid-carrying chamber of a closed system creates or increases the volume of an empty space within the chamber, thereby lowering the pressure of the fluid within the chamber. Fluid in fluidly-connected channels is drawn, i.e., sucked, into the low-pressure chamber. For example, if first valve component 50 has a longer stroke than second valve component 52, then valve sleeve 56 moves toward front end 53 after valve plunger 70 has already been positioned to seal second flow path $F_2$. The motion of valve sleeve 56 increases the volume of the back end 95 of first flow path $F_1$ between valve sleeve 56 and back end 51 of first valve component 50. If opening 49 includes a one-way valve, such as a check valve, a duckbill valve or a flap, indicated schematically at reference number 100 in FIGS. 3A-3C, so that the flow path between plunger seal 74 and opening 49 is effectively a closed system once plunger seal 74 is engaged, the movement of valve sleeve 56 and increased volume in back end 95 create a low pressure region in back end 95. Any fluid in front of plunger seal 74 is pulled towards back end 95 until sleeve seal 66 engages to close first flow path F1. The delay between the closing of the two flow paths $F_1$, $F_2$, may be selected so that substantially all of the fluid in front of plunger seal 74 is drawn into first flow path $F_1$ to reside behind sleeve seal 62 when first flow path $F_1$ is completely closed. As will be recognized by those in the art, a similar but oppositely-oriented process occurs when the stroke of second valve component 52 is longer than that of first valve component 50. As will be apparent to those in the art, having a longer stroke is not the only method by which the timing of the closing of first and second flow paths $F_1$, $F_2$ may be achieved, and any method of controlling the timing of the closing is suitable for use in the present invention. For example, the diameters of first and second valve components 50, 52 may be different, with the larger diameter valve component closing later than the other valve component. Also, if the opening of one valve component displaces a greater volume of fluid than the other valve component, then the valve component that displaces the greater volume will close later and create suck-back. Longer stroke only applies when the diameters are equal or the longer stroke diameter is greater.

Figure 4A:
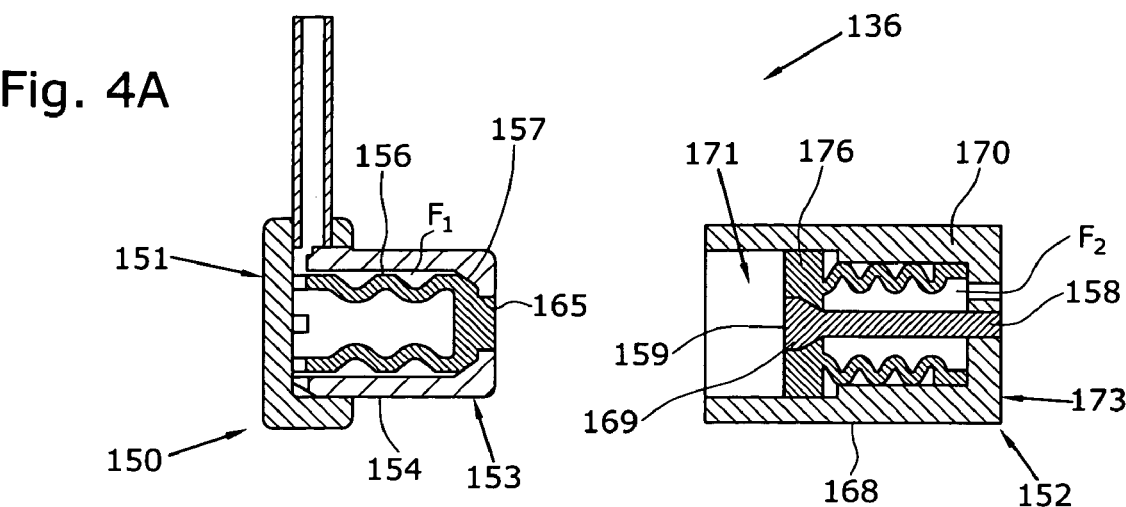
FIGS. 4A-4C are enlarged, cross-sectional views of another exemplary valve according to the present invention showing the opening sequence from closed in FIG. 4A to engaged and closed in FIG. 4B to open in FIG. 4C.
Figure 4B:
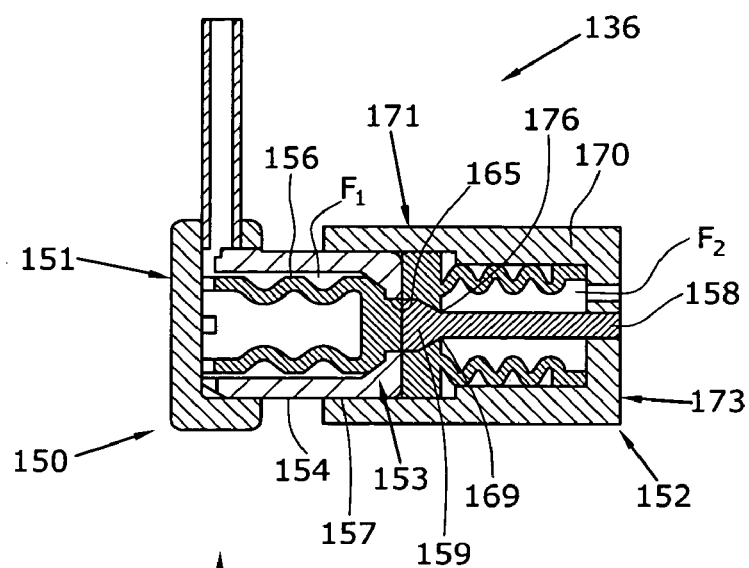
Figure 4C:
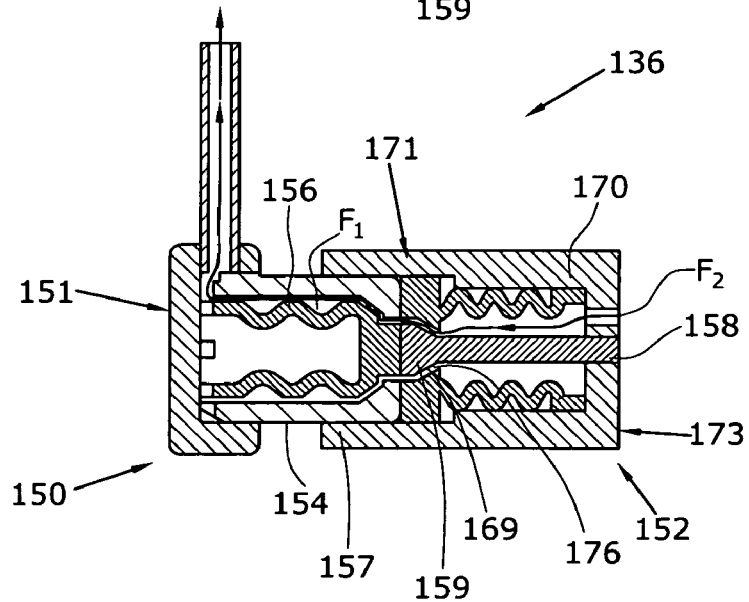

Referring to FIGS. 4A-4C, an alternate valve 136 is shown. Similar in many respects to valve 36 shown and discussed above with respect to FIGS. 3A-3C, valve 136 includes a first valve component 150 attached to either the fuel cartridge or the device and configured to be connected to a corresponding second valve component 152 attached to the other of the fuel cartridge or the device. Valve sleeve 156 may be made from an elastomeric material, such as rubber, urethane, silicone and the like. If made from an elastomeric material, valve sleeve 156 itself acts as a spring and as a seal for flow path $F_1$. When deformed due to an external force, such as by compression due to mating with second valve component 152, first flow path F1 is opened and energy is stored within the material of valve sleeve 156. When the external force is removed, valve sleeve 56 releases its stored energy and returns to its original shape to re-seal flow path $F_1$ such that no additional spring, such as spring 60 or plunger spring 72 as shown in FIGS. 3A-C, is required to re-establish the seal.

FIG. 4A shows first valve component 150 completely separated from second valve component 152, such that both first valve component 150 and second valve component 152 are sealed. First valve component 150 includes a first housing 154 having deformable valve sleeve 156 disposed therein. A first flow path $F_1$ is defined between first housing 154 and valve sleeve 156. First housing 154 includes a shoulder 157 formed near the interface of first valve component 150 and second valve component 152. When first valve component 150 is separated from second valve component 152, valve sleeve 156 is configured with a shoulder 165 to engage with shoulder 157 to seal first flow path $F_1$.

Similarly, second valve component 152 includes a second housing 168 configured to receive an end of first housing 154. A deformable valve plunger 170 is disposed within second housing 168 and is configured at one end with a shoulder 169. A valve post 158 is positioned within valve plunger 170. A second flow path $F_2$ is defined between valve plunger 170 and valve post 158. One end of valve post 158 terminates as a valve post cap 159. Valve post cap 159 is rigid and includes a shoulder 176 that is configured to engage with shoulder 169 such that shoulder 176 and shoulder 169 act as sealing surfaces to seal flow path $F_2$.

FIG. 4B shows the first stage of connection of first valve component 150 and second valve component 152, where first housing 154 has been inserted into second housing 168. At this stage, neither valve sleeve 156 nor valve plunger 170 have been deformed, so first flow path and second flow path are still sealed. However, first housing 154 abuts valve plunger 170 at the interface between first valve component 150 and second valve component 152 to form an intercomponent seal.

FIG. 4C shows the second stage of connection of first valve component 150 and second valve component 152, where first housing 154 has been fully inserted into second housing 168. Valve post cap 159 presses against and deforms valve sleeve 156, thereby separating shoulder 157 from shoulder 165 to open first flow path $F_1$. Similarly, first housing 154 is pressed against and deforms valve plunger 170, thereby separating shoulder 176 and shoulder 169 to open second flow path $F_2$.

To reseal first flow path $F_1$ and second flow path $F_2$ to close valve 136, first housing 154 is removed from second housing 168 in a two-stage process similar to the procedure for opening valve 136. As first housing 154 is first removed from second housing 168, either manually or automatically using any ejection mechanism known in the art, valve post cap 159 stops exerting a force on valve sleeve 156, allowing valve sleeve 156 to return to its original configuration. As such, shoulder 157 and shoulder 165 again engage to seal first flow path $F_1$. Similarly, first housing 154 stops pressing against valve plunger 170, allowing valve plunger 170 to return to its original configuration. As such, shoulder 176 and shoulder 169 again engage to seal second flow path $F_2$. However, the interface seal remains intact at this point.

In the next stage for closing valve 136, first housing 154 is fully removed from second housing 168 such that first housing 154 no longer abuts deformable valve plunger 170. As such, the intercomponent seal is broken, and first valve component 150 and second valve component 152 are completely separated. By unsealing the intercomponent seal last, less fluid is capable of escaping from first flow path $F_1$ and second flow path $F_2$ than if valve 136 were to close in a single stage.

FIGS. 5A and 5B show another alternate embodiment for a valve component 251. Valve component 251 forms the female part of a separable valve, such as valve 36 and valve 136. Preferably, valve component 251 is positioned on cartridge 40 to be mated with a second valve component on the device; however, valve component 251 may also be used on the device.

Valve component 251 includes a housing 254, which may be made from any material known in the art, such as stainless steel, plastics or resins. Housing 254 is configured to slidably contain a valve plunger 270. A flow path F is defined between housing 254 and valve plunger 270.

Housing 254 is configured with a first sealing surface 269 that corresponds with a second sealing surface 276 defined by the shape of valve plunger 270. When valve component 251 is separated from the male part (not shown) of the valve, spring 272 biases valve plunger 270 so that a seal is formed by compressing an O-ring 266 between first sealing surface 269 and second sealing surface 276. Spring 272 resides partially within housing 254 and partially within a cap 283 attached to housing 254.

The male part of the valve is configured to be inserted into housing 254, with an interface O-ring 264 sealing the interface of the male part and valve component 251. An O-ring retainer 285 is also provided to secure interface O-ring 264 in position. When valve component 251 is connected to the male part of the valve, the housing of the male part of the valve pushes against valve plunger 270 and moves valve plunger 270 toward cap 283. As such, first sealing surface 269 is separated from second sealing surface 276 to open flow path F through housing 254. When the male part of the valve is removed from housing 254, spring 272 pushes valve plunger 270 away from cap 283 so that first sealing surface 269 and second sealing surface 276 re-engage.

When the male part is removed from housing 254, residual fluid remains within flow path F. To minimize this amount of residual fluid within flow path F, housing 254 is made as short as practicable, preferably between about 4 mm and 8 mm for use with typical fuel cell cartridges such as cartridge 40. Shortening housing 254 reduces the overall length of flow path F, which consequently reduces the volume of flow path F. Reduction of the length of the flow path also reduces the amount of residual fuel in the fuel supply. As best seen in FIG. 5A, cap 283 also includes a plurality of openings 284. Openings 284 permit residual fluid between plunger O-ring 266 and cap 283 to drain back into the fluid reservoir within fuel cartridge 40 or to drain from the fuel supply to minimize the amount of unusable fuel. Therefore, when valve component 251 is reconnected with the male part of the valve, no residual fluid remains within flow path F to escape during connection or to inhibit a secure connection of the male part with valve component 251.

Preferably, the size and number of openings 284 are maximized, as openings 284 also allow for the fluid within the fuel supply to be drawn into valve component 251. Openings 284 assist in the complete removal of fuel from the fuel supply, such as when the fuel supply is nearly empty so that very little fuel remains therein. Large openings 284 allow the distance from openings 284 to plunger O-ring 266 to be minimized. As such, less pressure is required to draw fuel into valve component 251.

Another suitable valve adapted to minimize the residual fuel in the fuel supply is disclosed, which has provisional Ser. No. 60/699,865 and filed on Jul. 18, 2005. This application is incorporated by reference in its entirety. Further details of cartridge 40, such as multiple liners and absorbent material, are disclosed in commonly owned co-pending U.S. patent application Ser. No. 10/679,756, entitled "Fuel Cartridges for Fuel Cells and Methods for Making Same," filed on Oct. 6, 2003, the disclosure of which is hereby incorporated herein in its entirety by reference. For example, absorbent material may be included in back end 95 or at the interface between first and second valve components 50, 52.

While it is apparent that the illustrative embodiments of the invention disclosed herein fulfill the objectives stated above, it is appreciated that numerous modifications and other embodiments may be devised by those skilled in the art. For example, cartridge 40 may have no liner, in which case valve 36 would communicate directly with an interior compartment of cartridge 40. Also, different types of springs can be used in conjunction with the valves disclosed herein. Additionally, the valves can be manually actuated or opened by the user or by user operated magnets. Moreover, a filter located upstream of the valves described above to keep particulate(s) or fibers out of the valves can be included. Suitable filters include, but are not limited to, hydrophilic micro-membranes having a pore size sufficient to keep particulates or other solid objects out of the valves, which are wettable by the fuel contained in the fuel supplies. Such filter can be used with any embodiments described herein and described in the parent application, which has already been incorporated by reference. Additionally, in the embodiments described above one of the valve components may not have an internal seal, e.g., one valve component can be a flow conduit or a canula.

Therefore, it will be understood that the appended claims are intended to cover all such modifications and embodiments, which would come within the spirit and scope of the present invention.

The invention claimed is:

1. A valve comprising:
   a first valve component connectable to one of either a fuel supply or a device;
   a second valve component connectable to the other of either the fuel supply or the device, wherein one valve component is configured to be mated to the other valve component;
   an inter-component sealing member disposed between a first valve component face and a second valve component face;
   wherein each valve component comprises a housing, a movable inner body, and a flow path, wherein the movable inner body cooperates with a sealing surface to form a seal within the flow path of each valve component when the valve components are unconnected, and wherein during connection the inter-component sealing member forms an inter-component seal between the first valve component and the second valve component and before the flow path in at least one valve component opens, and wherein a back end of one of the valve components comprises a one-way valve fluidly connected to the flow path, so that when said valve component re-establishes the seal a suck-back effect is created.

2. The valve of claim 1, wherein the device comprises a fuel cell.

3. The valve of claim 1, wherein the device comprises a fuel supply filling apparatus.

4. The valve of claim 1, wherein one valve component is received within the other valve component.

5. The valve of claim 1, further comprising a sealing member positioned adjacent the sealing surface, wherein the movable inner body is biased and slidable within the housing, and wherein the movable inner body cooperates with the sealing member and the sealing surface to close the flow path.

6. The valve of claim 1, wherein the movable inner body is deformable.

7. The valve of claim 6, wherein the movable inner body is elastomeric.

8. The valve of claim 6, wherein the movable inner body seals the flow path.

9. The valve of claim 1, wherein one of the valve components comprises
   a valve post fixedly all ached to the valve component housing,
   a valve sleeve slidably disposed around the valve post, wherein the flow path is defined between the valve sleeve and the valve post, and
   wherein at least one post-sealing surface is disposed proximate to the flow path, and wherein the valve post and the valve sleeve cooperate with the post-sealing surface to seal the flow path.

10. The valve of claim 9, wherein the valve sleeve is sealed to the valve component housing.

11. The valve of claim 9, wherein at least one sleeve sealing member is disposed between the valve sleeve and the valve component housing.

12. The valve of claim 9, wherein the other valve component comprises a check valve.

13. The valve of claim 9 further comprising a cap affixed to one end of the housing, wherein the cap has at least one opening formed therein.

14. The valve of claim 9, wherein a length of the valve component housing ranges from about 4 mm to about 8 mm.

15. The valve of claim 1, wherein one of the valve components comprises a check valve.

16. The valve of claim 15, wherein the first and second valve components open simultaneously.

17. The valve of claim 15, wherein the first and second valve components open sequentially.

18. The valve of claim 15, wherein the first and second valve components close sequentially.

19. The valve of claim 18, wherein the closing of the later-closed valve component draws a fluid within the earlier-closed valve component and the later-closed valve component toward a back end of the later-closed valve component.

20. A valve comprising:
a first valve component connectable to one of either a fuel supply or a device;
a second valve component connectable to the other of either the fuel supply or the device, wherein a first valve component face is configured to mate with the second valve component face, and
an inter-component sealing member disposed between the first valve component face and the second valve component face,
wherein each valve component comprises a stationary body and a biased slidable body disposed within the valve component, and a flow path defined within the valve component, wherein the biased slidable body cooperates wit a sealing surface to form an internal seal within each valve component, and wherein during connection the stationary body of one valve component moves the biased slidable body of the other valve component, and wherein during connection the first valve component and the second valve component form an inter-component seal at an interface of the first valve component face and the second valve component face, and wherein the first and second valve components close sequentially such that a suck-back effect is created in the later-closing valve.

21. The valve of claim 20, wherein the later-closing valve has a larger displaced volume than the other valve.

22. The valve of claim 20, wherein the later-closing valve has a longer stroke than the other valve.

23. The valve of claim 20, wherein the stationary body of the first valve component comprises a housing of the first valve component and the stationary body of the second valve component comprises a center valve post.

24. The valve of claim 20, wherein a back end of one of the valve components comprises a one-way valve fluidly connected to the flow path.

25. A valve comprising:
a first valve component connectable to one of either a fuel supply or a device;
a second valve component connectable to the other of either the fuel supply or the device, wherein one valve component is configured to be connected to the other valve component;
wherein the first valve component comprises an internal seal when the valve components are disconnected and when the two valve components are connected a flow path is established therethrough and wherein a back end of the first valve component comprises a one-way valve fluidly connected to the flow path and the one-way valve closes when the two valve components are disconnected from each other, so that as the first valve component re-establishes the internal seal a suck-back effect is created.

26. The valve of claim 25, wherein the first valve component has a larger displaced volume than the second valve component.

27. The valve of claim 25, wherein the first valve component has a longer stroke than the second valve component.

28. The valve of claim 25, wherein when the two valve components are connected an inter-component seal is established.

* * * * *